(12) United States Patent
Excoffier

(10) Patent No.: US 12,523,738 B2
(45) Date of Patent: Jan. 13, 2026

(54) METHOD FOR POSITIONING OBJECTS IMPLEMENTED IN AN OBJECT OR IN A SERVER

(71) Applicant: Orange, Issy-les-Moulineaux (FR)

(72) Inventor: David Excoffier, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 359 days.

(21) Appl. No.: 18/069,500

(22) Filed: Dec. 21, 2022

(65) Prior Publication Data

US 2023/0194652 A1      Jun. 22, 2023

(30) Foreign Application Priority Data

Dec. 21, 2021   (FR) ...................... 2114096

(51) Int. Cl.
*G01S 5/02*       (2010.01)
*H04W 64/00*   (2009.01)

(52) U.S. Cl.
CPC ........ *G01S 5/02585* (2020.05); *G01S 5/0284* (2013.01); *H04W 64/00* (2013.01)

(58) Field of Classification Search
CPC ... G01S 5/02585; G01S 5/0284; H04W 64/00
USPC ....................................................... 342/451
See application file for complete search history.

(56) References Cited

U.S. PATENT DOCUMENTS

| 2018/0017660 | A1 | 1/2018 | Roquel |
| 2020/0275241 | A1 | 8/2020 | Levy et al. |
| 2022/0248366 | A1* | 8/2022 | Bao ...................... H04W 64/006 |

FOREIGN PATENT DOCUMENTS

| CN | 112995888 A | * | 6/2021 | ............. H04W 4/02 |
| CN | 118862924 A | * | 10/2024 | .......... G06F 3/1423 |
| EP | 3 451 755 A1 | | 3/2019 | |

OTHER PUBLICATIONS

French Preliminary Search Report for French Application No. FR 2114096 dated Jul. 8, 2022.

* cited by examiner

*Primary Examiner* — Harry K Liu
(74) *Attorney, Agent, or Firm* — Knobbe, Martens, Olson & Bear, LLP

(57) ABSTRACT

Various embodiments relate to a method for positioning objects implemented in an object or in a server. The disclosure relates to a method for positioning objects, implemented in a first object in communication with at least one second object, comprising determining a position of said first object. The method can comprise determining the location of said first object relative to the magnetic north, and determining the height of said first object relative to at least one reference point. The method can comprise obtaining the relative position of said at least one second object relative to said first object.

20 Claims, 10 Drawing Sheets

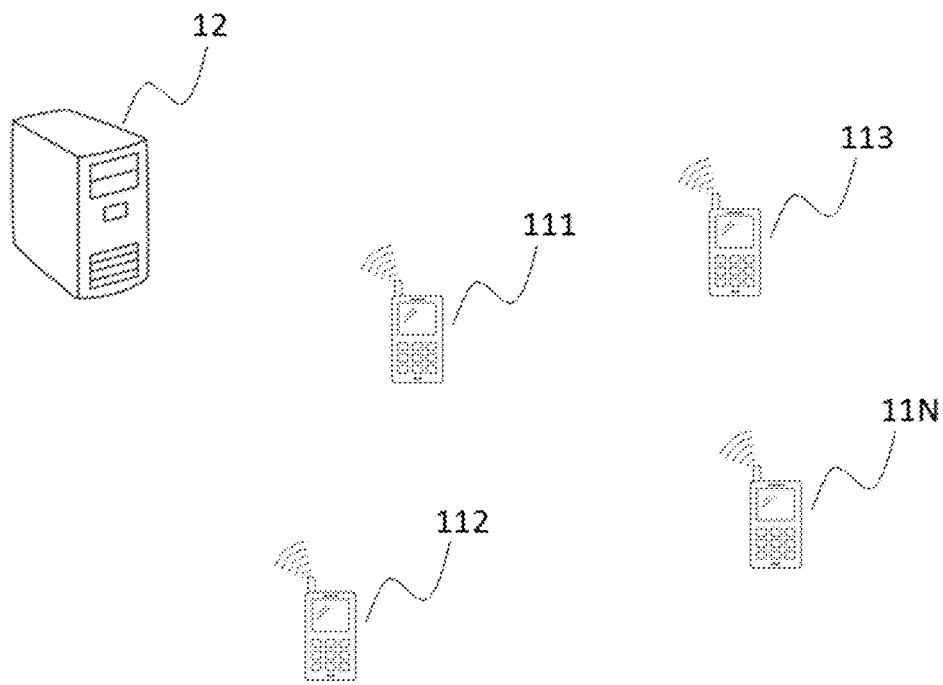
Fig. 1
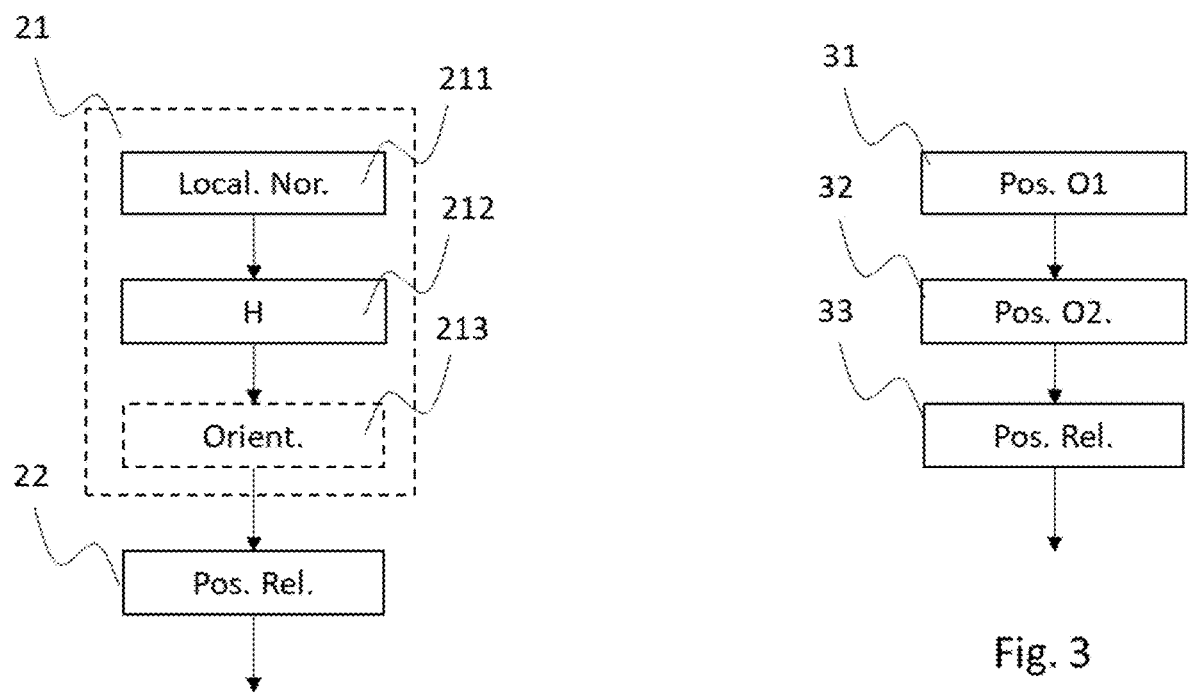
Fig. 2
Fig. 3

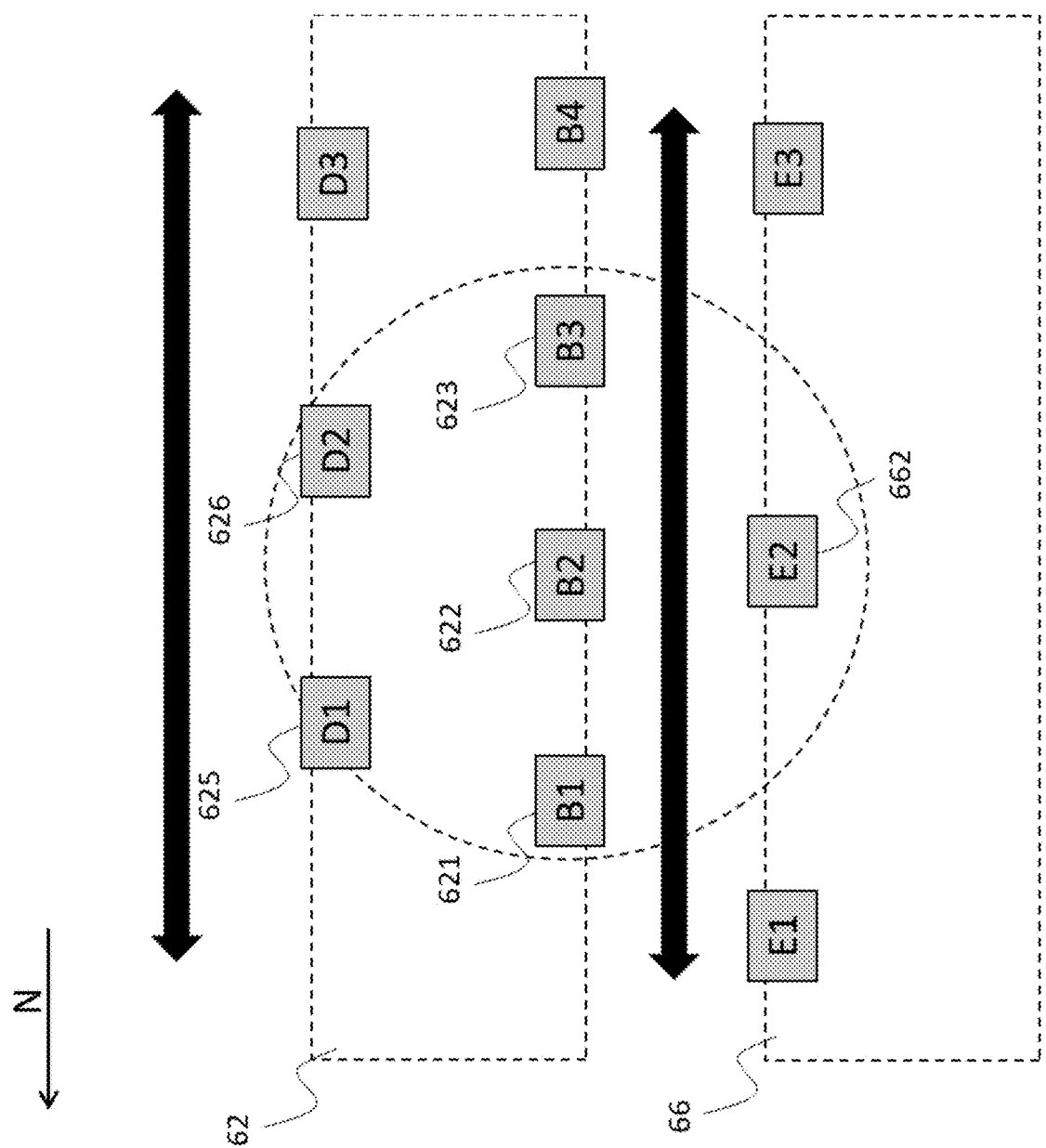

METHOD FOR POSITIONING OBJECTS IMPLEMENTED IN AN OBJECT OR IN A SERVER

CROSS-REFERENCE TO RELATED APPLICATIONS

This application claims foreign priority to French Patent Application No. FR 2114096, entitled "METHOD FOR POSITIONING OBJECTS IMPLEMENTED IN AN OBJECT OR IN A SERVER" and filed Dec. 21, 2021, the content of which is incorporated by reference herein in its entirety.

BACKGROUND

Field

The field of the disclosure is that of connected objects. More specifically, the disclosure relates to the relative positioning of objects therebetween, i.e. the positioning of objects relative to each other. In this manner, an object can know its geographical neighbours, and simply communicate therewith. Such objects can be fixed or mobile according to the disclosure, or some fixed and other mobile.

Description of the Related Technology

There are many object geolocation techniques.

Most of these techniques are based on a satellite positioning system, for example of the GPS, GLONASS or Galileo type. Such a satellite positioning system allows locating an object with an accuracy in the range of a few metres.

However, such a satellite positioning system may prove insufficient to accurately geolocate an object, with an accuracy in the range of a few centimetres. Such a satellite positioning system can also prove to be unusable in a constrained environment, for example in a supermarket, a warehouse, a basement, etc., in particular when the objects are placed in a building having very thick walls or on metal shelves.

Other object geolocation techniques have been proposed, based on the use of beacons or anchors whose geographical coordinates are known. For example, the position of an object can be determined based on the Wi-Fi access points to which the object is connected. If the object is equipped with an RFID tag, its position can also be determined from RFID readers positioned at reference locations.

The use of known fixed points (or "anchors") generally requires a prior installation work of these different fixed points, before being able to use an indoor location system. In addition, according to the configuration of the premises (thick walls, floors, . . . ), the number of known fixed points "visible" from the objects to be located can vary greatly to obtain an accurate location. Finally, these installations require a flawless operation and therefore a significant capacity for installation, configuration and maintenance in operational condition.

Again, such techniques do not offer a sufficient accuracy to accurately geolocate an object. In addition, they require the deployment of beacons or anchors to locate the objects.

There is therefore a need for a new object geolocation technique which has an accuracy in the range of a few centimetres, even in a constrained environment (for example subject to interference), and which does not rely on the use of beacons or anchors.

SUMMARY OF CERTAIN INVENTIVE ASPECTS

The disclosure proposes a solution for the geolocation of objects which does not have all the drawbacks of the prior art, in the form of a method for positioning objects, implemented in a first object, in communication with at least one second object.

Such a method implements:
 determining a position of said first object, implementing:
  determining the location of said first object relative to the magnetic north,
  determining the height of said first object relative to at least one reference point,
  possibly determining the spatial orientation of said first object relative to a reference coordinate system,
 obtaining the relative position of said at least one second object relative to said first object.

In this manner, the first object can accurately determine its position:
 its location relative to the magnetic north, i.e. if the North is in front of the object, behind the object, on one of the sides thereof, at a certain angle, etc.). For example, determining the location of said first object relative to the magnetic north implements at least one magnetometer-type sensor, such as a compass,
 its height relative to at least one reference point (defining for example a reference plane), for example relative to the ground, to a shelf, etc. For example, determining the height of said first object relative to at least one reference point implements at least one sensor belonging to the group comprising:
 a distance measuring sensor,
 an atmospheric pressure measuring sensor, for example a barometric sensor.

Possibly, the first object can also determine its orientation in space i.e. its pitch (rotational movement of the object about the transverse axis thereof), its roll (rotational movement of the object about the longitudinal axis thereof), and/or its yaw (horizontal rotational movement of the object about the vertical axis thereof). For example, the determination of the spatial orientation of said first object implements at least one sensor belonging to the group comprising:
 an accelerometer,
 a gyroscope,
 an inclinometer.

Once the position of the first object has been determined, it is possible to determine the relative position of at least one second object relative to the first object. This relative position can be calculated by the first object, or determined by a remote server and transmitted to the first object.

In particular, the proposed solution does not require the presence of fixed points (or beacons, anchors), at the previously known geographical coordinates.

The proposed solution can thus help with an accurate geolocation of the objects relative to each other, without any manual configuration of each object being necessary. In particular, when the objects can communicate at least two to two, it is possible to transmit configuration or update information to the first object, and to pass it on to the different objects, for example from the first object to at least one of its neighbours, then from the neighbouring object to at least one of its neighbours, etc ("step by step" or "de proche en proche" transmission), which allows an automation of the configuration/update of the objects, and consequently saving time.

For example, if the objects are of the price or tracking tag type, the proposed solution can help to save time when creating or reconfiguring the racks of a store or a warehouse.

According to a particular embodiment, obtaining the relative position of said at least one second object relative to said first object comprises obtaining a distance between said first object and said at least one second object.

For example, obtaining a distance between said first object and said at least one second object implements at least one sensor fastened on said first object and belonging to the group comprising:
an infrared sensor,
a time of flight (ToF) sensor.

According to a particular embodiment, obtaining the relative position of said at least one second object relative to said first object comprises detecting a radio signal transmitted by said at least one second object.

For example, a signal according to a radio standard of WiFi, Bluetooth®, Bluetooth® low energy (BLE), RFID, UWB, or other type can be transmitted by the second object. Upon detection of this signal, and in particular of its power, the first object can estimate the position of the second object relative to the first object. In particular, a solution of the trilateration or triangulation type can be implemented based on such radio signals.

According to a particular embodiment, the position of the first object once determined, or more generally at least one first information item useful for positioning said objects, can be transmitted to another object or to a remote server which centralises the positions of the different objects. In this manner, each object, or the remote server, can know the position of the other objects, or at the very least of its geographical neighbours.

According to a particular embodiment, the first object can receive at least one second information item useful for positioning said objects, from said at least one second object or from the remote server.

This information allows in particular estimating the relative position of the second object relative to the first object.

According to a particular embodiment, obtaining the relative position of one of said at least one second object relative to said first object implements an estimation of the position of said second object relative to said first object, delivering at least two candidate positions, a reception of at least one third information item useful for positioning said objects from at least one third object, and relating to a communication of said third object with said first object and/or said second object, and a selection of one of said candidate positions by taking into account said at least one third information item received from said third object.

Thus, if there remains an uncertainty about the position of a second object, it is possible to take into account information received from a third object to refine the position of the second object.

For example, said at least one first, resp. second, resp. third information item from said first, resp. second, resp. third, object, belongs to the group comprising:
an identifier of said first, resp. second, resp. third, object,
a location of said first, resp. second, resp. third, object relative to the magnetic north,
a spatial orientation relative to said first, resp. second, resp. third, object, relative to a reference coordinate system,
a distance between at least two of said objects among the first, the second and the third object,
a height of said first, resp. second, resp. third, object relative to said at least one reference point.

In particular, the first object can receive several of these information items simultaneously, or successively. For example, the first object can, firstly, obtain an identifier of a second object and a distance between the second object and the first object, then secondly, the position of the second object (i.e. location relative to the magnetic north, height relative to the reference point or plane, and possibly spatial orientation relative to a reference coordinate system).

According to one embodiment, the positioning method according to the disclosure implements the storage of at least one element belonging to the group comprising:
the position of said first object,
the relative position of said at least one second object relative to said first object,
at least one information item from said information items useful for positioning said objects.

In particular, the method according to the disclosure comprises obtaining, by the first object, configuration or update information of the first object, and transmitting, step by step, said configuration or update information to a set of objects.

In this manner, the first object can, for example, progressively construct a map for positioning the objects which are in communication with each other. It is noted that the first object can be in communication only with one or more second objects, themselves in communication with one or more third objects, etc. Each object can thus communicate with its direct neighbours, and pass on the information step by step, without requiring a communication with all the objects ("pair-to-pair" or P2P rather than "distributed" architecture).

The first object can thus have a list of the objects present in the vicinity thereof with their positioning in space and relative to each other.

According to a particular embodiment, at least one of the preceding steps (determining the position of said first object, obtaining the relative position of said at least one second object relative to said first object, transmitting or receiving information useful for positioning objects, etc.) is implemented periodically or in an event-driven manner, such as for example in the case of detection of a change in position of said first object.

In this manner, it is possible to have real-time information on the position of the objects and the positioning of the set of objects.

In particular, in certain embodiments, the method comprises triggering an alarm in the case of detection of a change in position of said first object or at least one second object.

For example, if the objects are works of art, cars, etc., it is possible to locate the objects relative to each other and to trigger an alarm in the case of inappropriate movements of an object (which could correspond to a theft of this object).

In a particular embodiment, obtaining the relative position of said at least one second object relative to said first object takes account of at least one physical constraint related to the place where said objects are positioned.

Such a physical constraint can be related to the room in which the objects are located (position of the walls, floor, ceiling, etc.) or to a structure supporting the objects (shelf, etc.).

For example, if several candidate positions are possible for a second object, it is possible to take into account the environment (wall, floor, ceiling, shelf, etc.) to decide the position of the second object. Thus, in the context of a supermarket, and considering two neighbouring objects at substantially the same height relative to the ground, it is possible to assume that they are on the same shelf and therefore aligned.

In another embodiment, the disclosure relates to a method for positioning objects, implemented in a remote server in communication with a first object and at least one second object, comprising:
- obtaining a position of said first object,
- obtaining a position of said at least one second object,
- determining the relative position of said at least one second object relative to said first object,
- the position of said first, respectively second, object comprising:
  - the location of said first, respectively second, object relative to the magnetic north,
  - the height of said first, respectively second, object relative to at least one reference point, and
  - possibly the spatial orientation of said first, respectively second, object, relative to a reference coordinate system.

Thus, it is possible to use a centralised server to collect the positions of the different objects, and to determine the relative positions of the objects. The characteristics and advantages of the positioning method, implemented by the server, are the same as those of the positioning method implemented by the first object, and are not described in more detail herein.

In particular, such a server can construct a map for positioning the objects, and thus have a global view with the positioning of the objects relative to each other and the communication links between the different objects.

In a particular embodiment, the server can transmit the determined relative position to the first and/or to the second object. In this manner, the construction of the positioning map can be implemented by at least one of said objects.

In particular, such a remote server stores at least one element belonging to the group comprising:
- the position of said first object,
- the position of said at least one second object,
- the relative position of said at least one second object relative to said first object,
- at least one information item useful for positioning said objects, as previously defined.

The disclosure moreover relates to a corresponding device, comprising:
- means for obtaining a position of a first object comprising:
  - the location of said first object relative to the magnetic north,
  - the height of said first object relative to at least one reference point,
- means for obtaining a relative position of at least one second object, in communication with the first object, relative to said first object.

In particular, such a device comprises means for obtaining configuration or update information of said first object, and for transmitting, step by step, said configuration or update information to a set of objects.

Such a device can be an object or a server as previously described.

The disclosure moreover relates to a corresponding object. Such an object, called first object, is in communication with at least one second object, and comprises:
- means for determining its position, comprising:
  - means for determining the location of said first object relative to the magnetic north,
  - means for determining the height of said first object relative to at least one reference point,
- means for obtaining the relative position of said at least one second object relative to said first object.

In another embodiment, the disclosure relates to a physical structure supporting at least one object according to the disclosure.

The disclosure further relates to a corresponding server. Such a server is in communication with a first object and at least one second object, and comprises:
- means for obtaining a position of said first object,
- means for obtaining a position of said at least one second object,
- means for determining the relative position of said at least one second object relative to said first object,
- the position of said first, respectively second, object comprising:
  - the location of said first, respectively second, object relative to the magnetic north,
  - the height of said first, respectively second, object relative to at least one reference point.

For example, the server is of the gateway type.

Such an object, respectively a server, is in particular adapted to implement the steps of the positioning method which is previously described in any one of the embodiments thereof. Such an object, respectively a server, might of course include the different characteristics relating to the positioning method according to the disclosure, which can be combined or taken separately. Thus, the characteristics and advantages of this object, respectively server, are the same as those of the positioning method. Consequently, they are not further detailed.

An embodiment also aims at protecting one or more computer programs including instructions adapted to the implementation of the positioning method according to at least one embodiment as described above, when this or these program(s) are executed by a processor, as well as at least one computer readable storage medium including instructions of at least one computer program as mentioned above.

BRIEF DESCRIPTION OF THE DRAWINGS

Other features and advantages of the disclosure will appear more clearly on reading the following description of a particular embodiment, given by way of a simple illustrative and non-limiting example, and the appended drawings, from which:

FIG. 1 illustrates an example of a system comprising a plurality of objects in which the disclosure can be implemented;

FIG. 2 shows exemplary steps of a positioning method according to one embodiment, implemented by a first object;

FIG. 3 shows exemplary steps of a positioning method according to one embodiment, implemented by a server;

FIG. 6A and FIG. 6B illustrate examples of front view and top view rackings, and the coverage area of an object B2;

DETAILED DESCRIPTION OF CERTAIN ILLUSTRATIVE EMBODIMENTS

General Principle

Figure 4A:
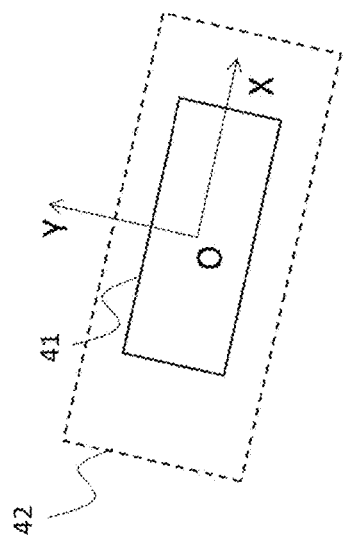
FIG. 4A, FIG. 4B and FIG. 4C illustrate different positions of a tag relative to the support thereof.

The system illustrated in FIG. 1 is considered, comprising a plurality of connected objects 111, 112, . . . , 11N, for example mobile terminals, and possibly a remote server 12. The objects 11i, for i ranging from 1 to N, can communicate at least in pair. If a remote server 12 is present, at least some of the objects can communicate with the server 12.

FIG. 2 illustrates the general principle of the disclosure, implemented in a first object 111 to locate neighbouring objects. Each object can be considered in turn as a first object, to locate its own neighbours, and gradually construct a map for positioning the objects.

In a first step 21, the first object 111 can determine its geographical position.

More specifically, the first object 111 can determine its location 211 relative to the magnetic north, its height 212 relative to at least one reference point, for example relative to the reference plane corresponding to the ground, and possibly its spatial orientation 213 relative to a reference coordinate system or reference mark.

At least some of the other objects 112, 113, . . . 11N (for example each of these other objects) can for example do the same (or have done the same beforehand in certain embodiments).

In a second step 22, the first object can obtain the relative position of at least one second object 112, 113, relative to the first object 111.

For example, this relative position can be estimated by the first object 111. The first and the second object can thus communicate with each other directly, since they are within signal range of each other. The second object is also called "direct neighbour" of the first object.

Alternatively, the relative position can be determined by the remote server 12 and transmitted to the first object 111.

Thus, according to a particular embodiment, the system can comprise a remote server 12. FIG. 3 illustrates exemplary steps implemented by such a server.

In a first step 31, the server can obtain the position of the first object 111 (i.e. its location relative to the magnetic north, its height relative to at least one reference point, and possibly its spatial orientation relative to a reference coordinate system), from the first object if it is in communication with the server.

In a second step 32, the server can obtain the position of at least one second object 112, 113 (i.e. its location relative to the magnetic north, its height relative to at least one reference point and possibly its spatial orientation relative to a reference coordinate system), from the second object if it is in communication with the server.

In a third step 33, the server can determine the relative position of the second object 112 relative to the first object 111.

The different steps of the disclosure are described below in more detail.

In order to vary the examples, it is now considered that the connected objects are tags (price, parcel tracking, etc.).

Position of an Object

As indicated above, in a first step 21, the first object can determine its geographical position. For example, the first object is equipped with one or more sensors, allowing determining its position, in particular its location 211 relative to the magnetic north, its height 212 relative to at least one reference point, and/or possibly its orientation. 213 in space (pitch, roll, and/or yaw for example).

Location Relative to the Magnetic North

The location 211 of an object according to the disclosure relative to the magnetic north is for example determined by using a sensor of the magnetometer type, measuring the magnetism, i.e. the direction, the force and the relative change of a magnetic field at a given place. For example, a compass can be used to measure the direction of the earth's magnetic field.

The use of a magnetometer type sensor according to one embodiment allows in particular determining the location of the object relative to the magnetic north, i.e. if the tag is facing the magnetic north, back to the magnetic north, at a certain angle to the magnetic north.

According to a particular embodiment, it is thus possible to determine whether a tag is placed on a shelf in a supermarket, for example, or on a gondola end, the gondola ends generally being positioned at right angles relative to the racks. For example, the magnetometer equipping the different tags allows detecting that the magnetic north is located behind the tags positioned at the head of the gondola, and to the left of the tags positioned on a shelf of one rack.

If the tags are equipped with a magnetometer, it is thus possible to know their positioning relative to each other relative to the magnetic field, and this for each tag.

Alternatively, other techniques can be implemented to locate an object relative to the magnetic north.

Orientation in Space

It is also possible to determine the orientation 213 of the object in space, relative to a reference coordinate system or mark. For example, such a reference mark can be an orthogonal mark centred on a reference point (centre of the Earth, centre of the object, etc.), formed by three axes, respectively vertical, horizontal and transverse axes.

In a particular embodiment, the reference mark is centred on the object, and corresponds to a nominal position of the object (for example a tag which is correctly positioned on the support thereof). It is thus possible to define the orientation of an object in space by taking into account its rotation relative to the three axes thereof, where O is the centre of the object:

the roll, which is a rotational movement of an object about the longitudinal axis O-X thereof (roll axis),
the pitch, which is a rotational movement of an object about the transverse axis O-Y thereof, and
the yaw, which is the horizontal rotational movement of an object about the vertical axis O-Z thereof.

Different solutions are proposed to determine the orientation of the object in space.

According to a first example, it is considered that the object is equipped with a sensor of the three-axis accelerometer type.

It is recalled that an accelerometer is an electromechanical device used to measure the acceleration forces. These forces can be dynamic (like the movement or vibration forces) or static (like the force of gravity).

The use of an accelerometer according to this first example allows, on the one hand, measuring the dynamic forces, and thus detecting a change in position of the tag (for example because it has fallen or has been moved). Such a change can in particular be notified to one or more users, to at least one second object (which can be a direct neighbour of the first object), and/or to the remote server.

Figure 4B:
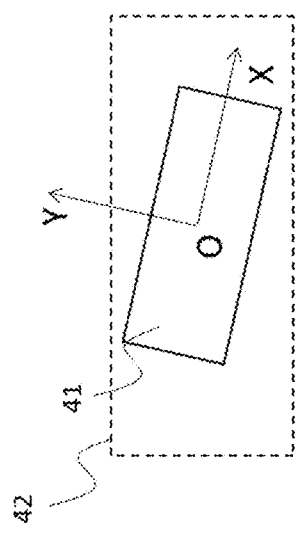

For example, FIGS. 4A and 4B illustrate the same tag 41 at two different times t1 and t2.

At the first time t1, illustrated in FIG. 4A, it is considered that the tag 41 is correctly positioned on a system 42 for hooking to a shelf, also called support 42.

At the second time t2, illustrated in FIG. 4B, it is considered that the tag has been partially unhooked, according to a yaw movement about the axis O-Z thereof (perpendicular to the surface of the tag). The accelerometer allows detecting a partial unhooking of the tag 41 from its system 42 for hooking to the shelf.

The use of an accelerometer therefore allows measuring the acceleration of a moving object, (since it allows measuring a linear non-gravitational acceleration) as a price tag which falls or which is moved.

The use of an accelerometer also allows measuring the inclination of a stationary object (since it allows directly measuring the gravitational field). Thus, returning to FIG. 4A, the accelerometer allows measuring the orientation in space of the stationary tag 41, well positioned on the support thereof. Indeed, the accelerometer does not make the difference between the acceleration and the gravity. When stationary, the accelerometer can measure the gravitational field. A three-axis accelerometer can thus measure the component of the force of gravity along three axes:
  the X axis (oriented along the length direction)
  the Y axis (oriented along the width direction) and
  the Z axis (oriented perpendicular to the surface).

The use of a sensor called "3-axis accelerometer" allows positioning an accelerometer in each of the X, Y and Z planes, and thus determining the orientation of the object in space.

As indicated above, there are other solutions to determine the orientation of the object in space.

Thus, according to a second example, it is considered that the object is equipped with two sensors, including an accelerometer-type sensor and a gyroscope-type sensor.

The use of a gyroscope and an accelerometer according to this second example allows knowing in which spatial orientation relative to a reference mark the object is located.

Returning to FIGS. 4A and 4B shown above, it is considered that in FIG. 4A, the tag 41 and the system 42 for hooking to the shelf are well positioned, whereas in FIG. 4B, the tag 41 is not positioned nominally on the system 42 for hooking to the shelf.

Figure 4C:
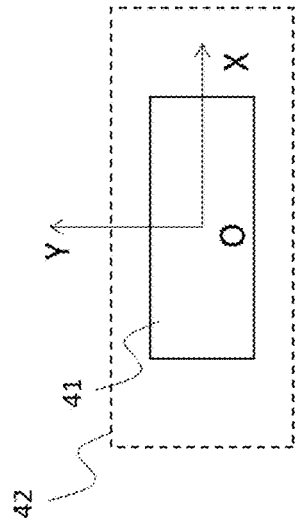

According to FIG. 4C, the tag 41 is nominally positioned on the system 42 for hooking to the shelf, but it is the hooking system as a whole which has been unhooked and is not nominally positioned. In this case, several tags may have the same positioning angle, and it is possible to detect that the hooking system is wrongly oriented. Such a problem can be notified to one or more users, to at least one second object, and/or to the remote server.

Other solutions can still be considered to determine the orientation of the object in space, based for example on the use of a three-axis inclinometer or any other technical solution.

Height Relative to at Least One Reference Point

In addition to determining the location of the object relative to the magnetic north, and possibly the spatial orientation of the object, it is also important to know how to determine the "vertical position" of an object, i.e. the height at which the object is located relative to a reference point or plane, for example relative to the ground or relative to another object. This allows, for example, determining whether two tags are fastened to the same shelf.

To do this, various solutions can be considered.

According to a first example, a sensor measuring the atmospheric pressure, of the barometric sensor type for example, can be used. It is noted that such a sensor can only operate at ambient air pressure, and therefore cannot be used in environments under controlled atmospheric pressure.

Such an accuracy pressure sensor of the barometric sensor type can in particular be used to measure the relative height between different objects. Thus, each object can accurately know the atmospheric pressure which surrounds it, and an associated result in Pascal.

A simple calculation between the different data of the objects therebetween allows approaching to within 5 centimetres the height which separates them from each other. It is thus possible to classify the objects according to their atmospheric pressure measurement, the lowest value indicating the objects closest to the ground, and the highest the furthest.

According to a second example, the object can be equipped with a sensor allowing measuring a distance between the object (first object) and another object (second object), or the object (first object) and the ground. To do this, this sensor can be positioned in the direction of the ground.

It should be noted that many technical solutions are available for measuring a distance: ultrasound, laser, capacitive, infrared, time-of-flight measurement, etc.

The different steps allowing measuring a distance according to an exemplary embodiment are described below.

It is sought herein to measure the distance between the object carrying the sensor and the ground, vertically to the ground.

Figure 5A:
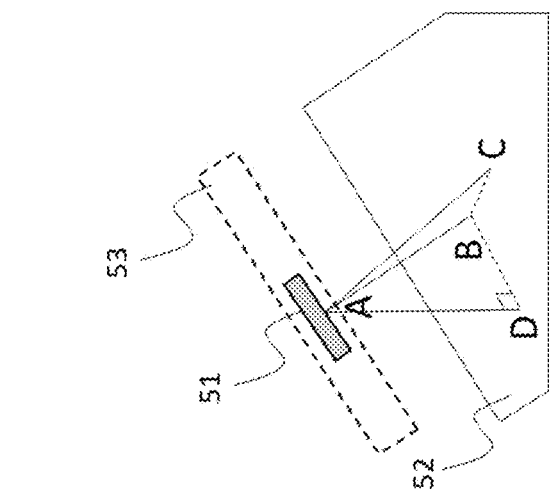
FIG. 5A, FIG. 5B and FIG. 5C illustrate the determination of the height of an object vertically relative to the ground according to a particular embodiment.

As illustrated in FIG. 5A, it is possible that the object is not positioned perfectly vertically relative to the ground, but is installed in a slightly inclined manner (rotation relative to the longitudinal axis thereof).

Thus, FIG. 5A illustrates a sectional view of a tag 51, equipped with a distance measuring sensor positioned on the lower slice or edge of the tag 51, for example in the middle of the lower slice of the tag, corresponding to the point A, and directed in the direction of the transverse axis of the tag (direction AC). Such an inclination of the tag allows, for example, a better visibility of the information it carries for the users.

In this example, the problem to be solved is to find the value of the height of the system vertically from the ground 52 (distance AB), thanks to an angle given by the gyroscope ($\widehat{BAC}$) and the value of a side provided by the distance sensor (distance AC): AB=cos($\widehat{BAC}$)×AC.

For example, if an angle $\widehat{BAC}$=24° (given by the gyroscope) and a distance measurement AC=150 cm (given by the sensor) are considered, it is possible to determine AB=cos(24°)×150=137.03 cm.

It is thus possible to determine the height of the object relative to the ground. Herein, the tag 51 is positioned vertically at 137.03 cm from the ground.

Figure 5B:
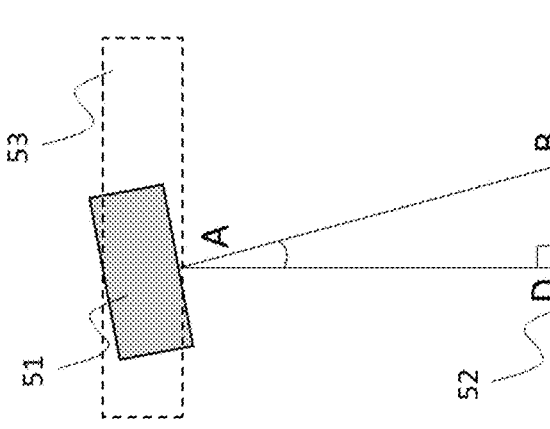

In the case where the object would not be previously positioned horizontally, as illustrated in FIG. 5B, it is possible to perform a new calculation to find the value that is closest to the vertical relative to the ground.

Thus, FIG. 5B illustrates a front view of the tag 51, positioned on a shelf 53, the tag 51 not being positioned horizontally (rotation about the axis which is perpendicular to the surface of the tag).

Figure 5C:
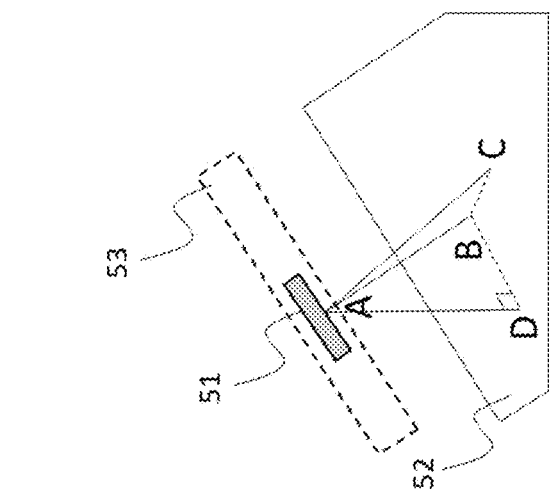

FIG. 5C schematises this offset relative to the vertical in two axes (a first offset related to the rotation of the tag about the longitudinal axis thereof, corresponding to an inclination of the tag, and a second offset related to the rotation of the tag about the axis which is perpendicular to the surface of the tag, corresponding to non-horizontal positioning).

The distance BC to be compensated/straightened corresponds to the advance related to the inclination of the tag 51. The distance BD to compensate/straighten corresponds to the bias related to the non-horizontal positioning of the tag 51.

It is sought herein to find the value of the height of the system vertically from the ground (AD), thanks to an angle given by the gyroscope $\widehat{BAD}$ and the value of one side, as obtained by the previous calculation: AD=cos($\widehat{BAD}$)×AB.

Returning to the preceding example, if an angle $\widehat{BAD}=5°$ (given by the gyroscope) and a distance measurement AB=137.03 cm (given by the previous calculation) are considered, it is possible to determine AD=cos(5°)× 137.03=136.50 cm.

It is thus possible to determine the height of the object relative to the ground. Herein, the tag 51 is positioned vertically at 136.50 cm from the ground.

It is noted that the step of compensation for the bias related to the non-horizontal positioning of the tag 51 is optional, in particular if the height of the shelves therebetween is greater than the possible calculated error. Thus, if each shelf is separated by 30 cm, the margin of error of 5.3 mm in the preceding example can possibly be considered negligible.

At the end of these different steps, the position of an object is therefore known, i.e. its location relative to the magnetic north, its spatial orientation, and its height relative to at least one reference point.

Such steps can be implemented for each object of the system, for example for each object 111, 112, 11N of the system illustrated in FIG. 1.

It is in particular possible to classify the different objects by height (for example to identify a group of objects in which all objects are substantially at the same height, and therefore probably located on the same shelf/on the same horizontal plane) and/or by taking into account their location relative to the magnetic north (for example to identify a group of objects in which all objects are located in the same manner relative to the magnetic north: facing north, east, west, facing south, or in any other position relative to the north, and therefore probably located in the same racking).

It is noted that the step of determining the position of an object can be implemented once, in particular if the object is stationary, or several times, for example periodically or following a triggering event (internal or external).

For example, a movement or change in position of an object, which can in particular be detected by one of the sensors described above, triggers a new determination of the position of the object.

The object can for example wait until the movement is finished to determine its position.

A filter can possibly be applied to avoid the triggering of a new determination of the position of the object for the weakest movements (for example micro-jolt s generated when someone walks next to the object).

Knowing the position of at least one first object, it is then sought to determine its position relative to other objects.

According to a first embodiment, each object can transmit its position to a remote server, for example the server 12 of FIG. 1, which can thus determine the positions of the different objects therebetween.

According to a second embodiment, a first object (and possibly all objects of the system) can interrogate ("scan") its environment to obtain information on at least some of the surrounding objects, located in the vicinity of its own position, or spontaneously receive (i.e. without interrogation from the first object) this information on surrounding objects. The first object can thus determine the position of at least one second object relative to its own position.

In the rest of the description, the context is that of this second embodiment, according to which the first object itself calculates its relative position relative to at least one second object (which is a direct neighbour of the first object).

Relative Position of the Objects

At this step, the aim is to determine the relative position between a first object and at least one second object with which it can communicate, for example from a distance value between the first object and at least one second object.

Obtaining a Distance Value

Different solutions are proposed for obtaining a distance value between the first object and at least one second object.

Thus, according to at least one embodiment, one or more additional sensors can be provided on all or part of the slices/edges of the first object (left, right, top, bottom, and/or in the corners, according to the shape of the object), allowing measuring a distance between the first object and at least one second object. As already indicated, many technical solutions are available for measuring a distance: ultrasound, laser, capacitive, infrared, time-of-flight ("ToF") measurement, etc. This embodiment allows an accurate measurement of the distances between two objects. However, this measurement is only possible if the second object is positioned substantially in the axis of the sensor of the first object.

In at least one embodiment, it is possible to use a solution of the trilateration or triangulation type to geolocate the objects, in particular when they are located in the vicinity of each other. In particular, it is considered that the objects can communicate at least in pair (two to two). The objects therefore have wireless communication means, for example of the Bluetooth® type (in particular Bluetooth® low energy, BLE), UWB, WiFi or other. These communication means can be used to detect nearby objects and determine the distances between these objects.

It should be noted that such a solution does not require the use of additional fixed equipment whose geographic coordinates are known in advance, such as of beacon or anchor type.

In addition, it is possible to play on the power of the radio signals so that a first object only detects the second closest objects. For example, the first object can search only for the objects located at a short distance therefrom by reducing the energy required for the wireless communication (for example to its bare minimum).

It is also possible to enlarge or reduce the range of the radio signal to allow the first object to detect more or fewer objects around it: the less the signal is strong, the less it propagates far, and thus fewer objects around the first object are detected. According to the expected use and context, it is also possible to use this communication system to filter the objects around the first object.

It should moreover be noted that according to the type of technology used for the wireless communications, the range and accuracy are variable.

In a third embodiment, it is possible to combine the two embodiments presented above, for example by using sensors to know the distance between the first object and its nearest neighbours, and by using radio waves to know more exhaustively the set of neighbours of the first object, according to the range of the radio signal.

At the end of this step, the first object therefore has a distance value relative to at least one second object (which is close to the first object).

Knowledge of the Neighbouring Objects

In addition to a distance value, the first object can obtain other information on the objects in the system.

Such a discovery process can be used by the first object to request and/or receive the characteristics of other objects present in the system, for example an identifier, the services supported or offered by another object, etc. This information can be transmitted spontaneously by a second object, or in response to a query transmitted by the first object.

According to a first example, as indicated above, the first object can use a wireless communication protocol to communicate with the other objects within signal range. It should be noted that the Bluetooth® or BLE wireless protocol integrates, according to the corresponding standard, capacities for automatic discovery of other Bluetooth objects.

According to a second example, it is possible to use communication protocols called "zero configuration" communication protocols allowing this automatic discovery of objects, such as mDNS, DDSP, WS-Discovery, or any other type of protocol allowing this automated and decentralised discovery.

Positioning of the Neighbouring Objects

At the end of the preceding steps, the first object can therefore have values of distance relative to the neighbouring objects.

It can thus build a list of objects, with the characteristics associated with these objects. The first object can in particular collect at least one additional information item useful for positioning the objects, from a second object (direct neighbour of the first object) or from a third object (indirect neighbour of the first object) belonging to the group comprising:
- an identifier of the object
- a location of the object relative to the magnetic north,
- a spatial orientation of the object relative to a reference mark,
- a height of the object relative to at least one reference point, for example relative to the ground,
- etc.

The distance values and information useful for positioning the objects can be obtained at the same time or in a deferred manner.

The first object (Object1) can thus store the different information received from the second objects (Object2), for example in the form of the following table:

| Identifier | Distance relative to | Location relative to the | Height relative | Other information (for example: |
|---|---|---|---|---|
| Object 2 #1 | Object 1 | magnetic north | to the ground | direction of object) |
| Identifier | Distance relative to | Location relative to the | Height relative | Other information (for example: |
| Object 2 #2 | Object 1 | magnetic north | to the ground | direction of object) |
| Identifier | Distance relative to | Location relative to the | Height relative | Other information (for example: |
| Object 2 #3 | Object 1 | magnetic north | to the ground | direction of object) |
| Identifier | Distance relative to | Location relative to the | Height relative | Other information (for example: |
| Object 2 #4 | Object 1 | magnetic north | to the ground | direction of object) |
| ... | ... | ... | ... | ... |
| Identifier | Distance relative to | Location relative to the | Height relative | Other information (for example: |
| Object 2 #n | Object 1 | magnetic north | to the ground | direction of object) |

The first object can also generate a map for visualizing the positions of the second objects around it, also called a graph, allowing simply visualise the objects in the vicinity of the first object, with which the first object can communicate directly (direct neighbours).

Figure 6A:
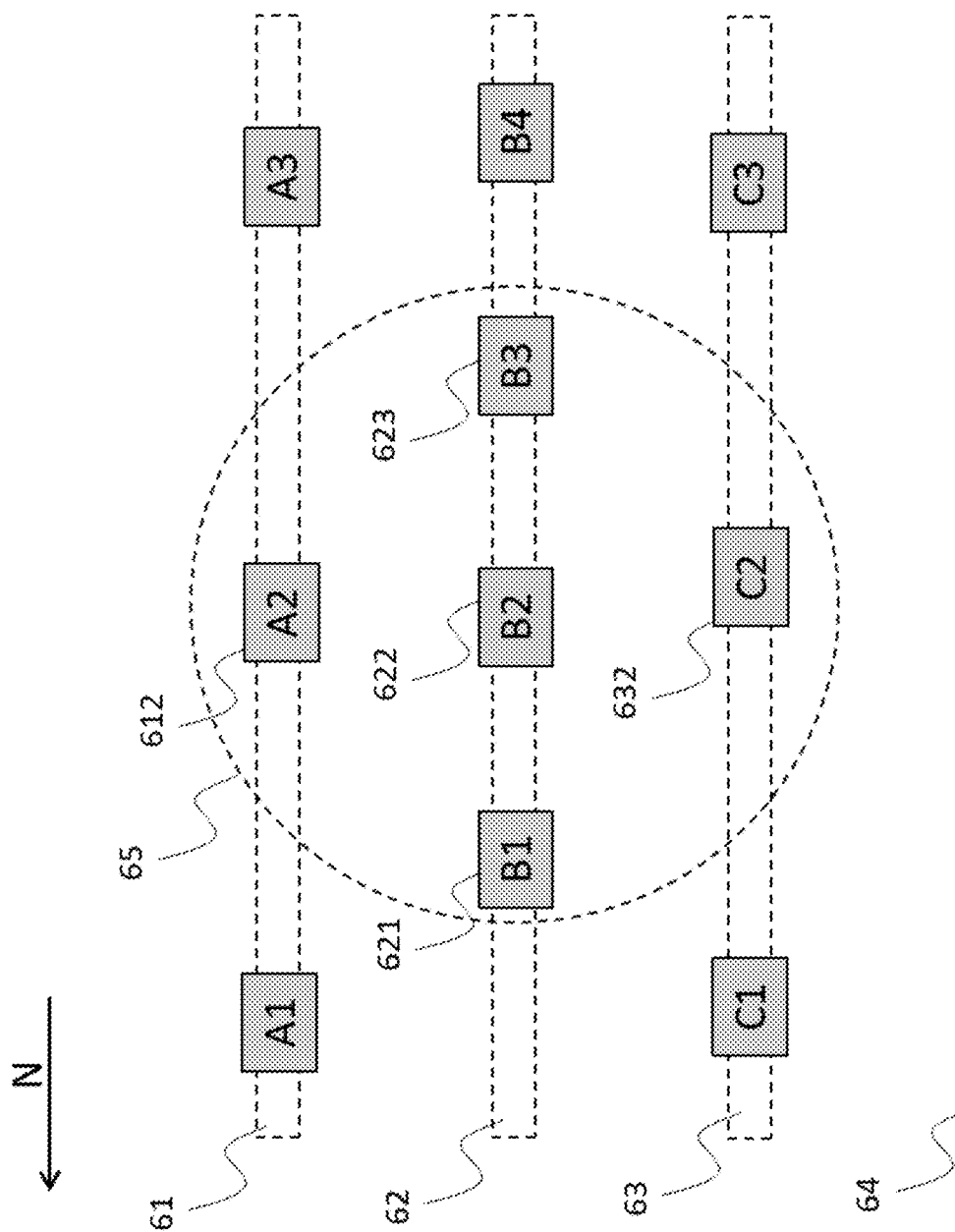

By way of example, FIG. 6A illustrates a front view of a racking I, comprising several shelves 61, 62, 63, on which price tags are placed (A1, A2, A3 on the upper shelf 61, B1, B2, B3, B4 on the intermediate shelf 62 and C1, C2, C3 on the lower shelf 63), and the floor 64.

It is considered that the tag B2 622 is a first object, whose position is determined as detailed above, for which it is sought to determine the relative position relative to the neighbours thereof. The coverage area of the tag B2 substantially corresponds to a sphere, represented by the disc 65 in the front view of FIG. 6A. This coverage area corresponds to the region in which the first object B2 can transmit or receive signals, according to its transmission/reception power for example. Thus, the first object B2 can communicate with the second objects B1 621, A2 612, B3 623, C2 632 located in the coverage area thereof, considered as "visible" to the first object B2. These second objects B1, A2, B3, C2 are also called "direct neighbours" of the first object B2.

FIG. 6B illustrates a top view of the racking I, in section above the intermediate shelf 62. It is noted that other shelves could be taken into account in reality, but are not, in order to simplify this purely illustrative example. In this top view, another shelving II and the intermediate shelf 66 of this shelving II are also seen. The double arrow illustrates the aisle between the two rackings, corresponding to a user passage area. As indicated above, the coverage area of the tag B2 corresponds substantially to a sphere. The second objects D1 625 and D2 626, located on the same shelf 62 as the first object B2 622, but facing another aisle, as well as the second object E2 662, located on the shelf 66 of racking II, are located in the coverage area of the first object B2.

The first object B2 can therefore communicate with the second objects B1, A2, B3, C2, D1, D2 and E2, all located in the coverage area thereof.

It is considered that the first object B2 knows its position, in particular its height relative to the ground 64 (for example 60 cm) and its location relative to the magnetic north (for example 90°).

The first object B2 can in particular receive information from the second objects located in the coverage area thereof, and store this information:

| Identifier remote Object 2 | Distance relative to Object 1 (B2) | Location relative to the magnetic north | Height relative to the ground | Other information (for example: direction of object) |
|---|---|---|---|---|
| B1 | 30 cm | 90° | 60 cm | |
| B3 | 30 cm | 90° | 60 cm | |
| A2 | 40 cm | 90° | 100 cm | Is not at the same height as B2 |
| C2 | 40 cm | 90° | 20 cm | Is not at the same height as B2 |
| D1 | 80 cm | 270° | 60 cm | Location relative to the magnetic north opposite relative to B2 |
| D2 | 80 cm | 270° | 60 cm | Location relative to the magnetic north opposite relative to B2 |
| E2 | 150 cm | 270° | 60 cm | Location relative to the magnetic north opposite relative to B2 |

Figure 7:
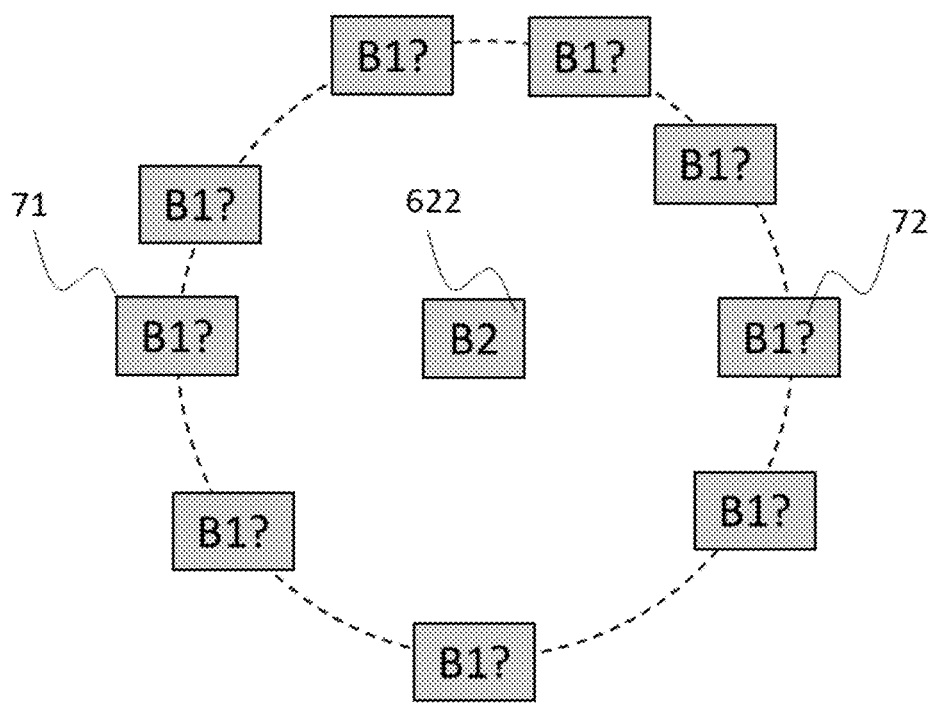
FIG. 7 illustrates different candidate positions for an object.

It is noted that the information received by the first object B2 is not sufficient to accurately determine the position of the second objects B1 and B3. Thus, when considering only the information given by the height relative to the ground (60 cm), the location relative to the magnetic north (90°), and the distance relative to the object B2 (30 cm), there are several candidate positions for the second object B1, respectively B3, located on a circle, as illustrated in FIG. 7. If it is assumed that the second objects B1 and B3 are on the same shelf (since they are at the same height relative to the ground), they are probably on the same plane, facing the gaze of users moving in the aisle. There therefore remain two candidate positions 71, 72 for the objects B1 and B3. The determination of the position of one of these two objects (for example B3) therefore allows deducing the position of the other object (for example B1).

To remove this uncertainty, which only exists if focusing on a single object (B2), it is possible to take into account information from at least one third object, which is close to a second object, i.e. neighbour of B1 or B3 (i.e. still indirect neighbour of the first object B2).

For example, it is now considered that the tag B3 623 is a first object.

Figure 8:
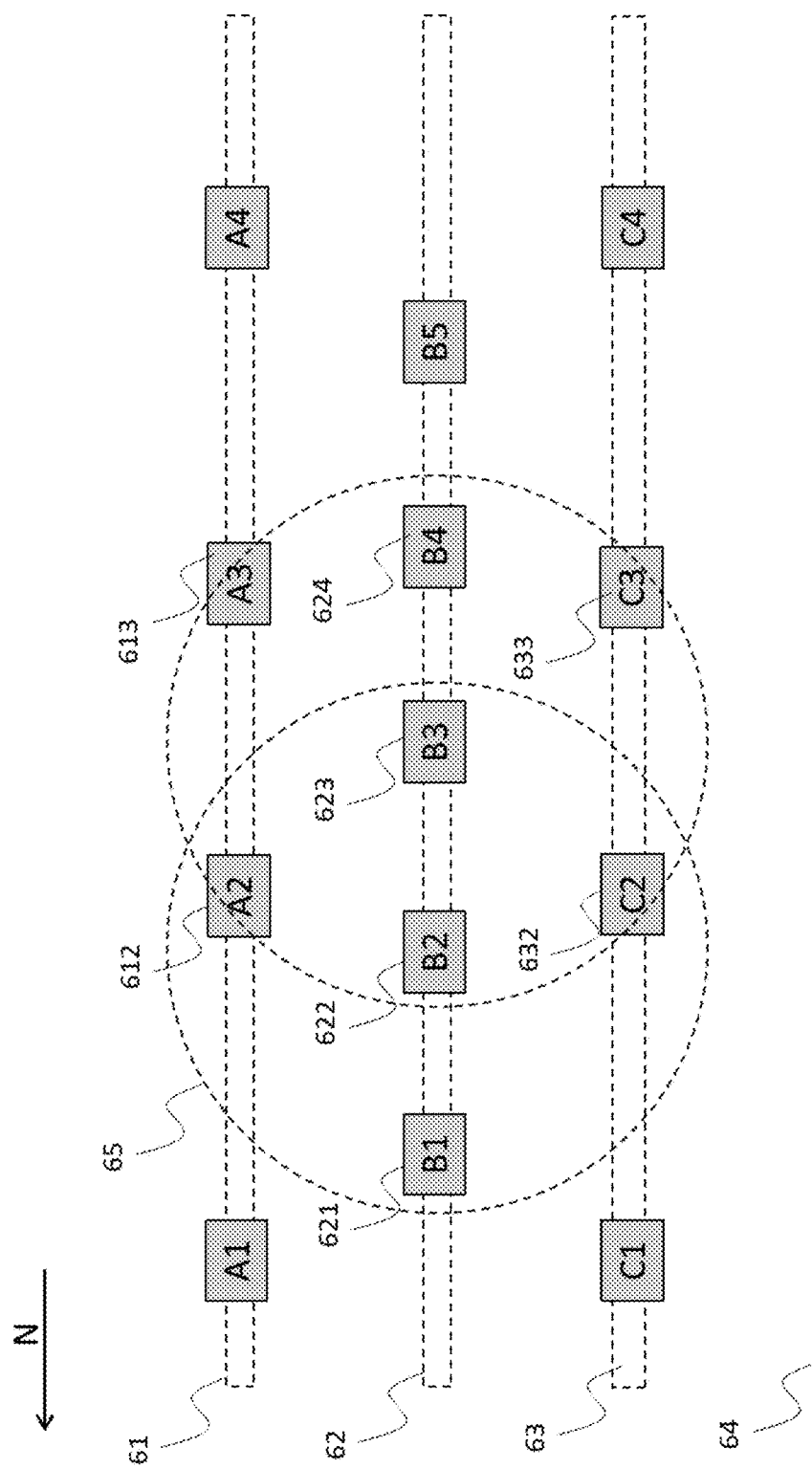
FIG. 8 shows the example of front view racking of FIG. 6A, and illustrates the coverage area of an object B3.

As illustrated in FIG. 8, the coverage area of the first object B3 corresponds substantially to a sphere 81, of the same diameter as the sphere 65 if the same transmission/reception characteristics are considered for the object B3 as for the object B2. Thus, the first object B3 can communicate with the second objects B2 622, A2 612, A3 613, B4 624, C3 633 and C2 632 located in the coverage area thereof, considered as "visible" to the first object B3. These second objects B2, A2, A3, B4, C3 and C2 are the "direct neighbours" of the first object B3. The objects A3, B4, and C3 are indirect neighbours of the object B2 (also called third objects relative to first object B2).

| Identifier remote Object 2 | Distance relative to Object 1 (B3) | Location relative to the magnetic north | Height relative to the ground | Other information (for example: direction of object) |
|---|---|---|---|---|
| B2 | 30 cm | 90° | 60 cm | |
| B4 | 30 cm | 90° | 60 cm | |
| A2 | 50 cm | 90° | 100 cm | Is not at the same height as B3 |
| A3 | 50 cm | 90° | 100 cm | Is not at the same height as B2 |
| C2 | 50 cm | 90° | 20 cm | Is not at the same height as B3 |
| C3 | 50 cm | 90° | 20 cm | Is not at the same height as B2 |

It is noted that the object B1 is not in the coverage area 81 of the first object B3 (the object B1 is out of visibility of the first object B3). Object B1 is an indirect neighbour of the first object B3 (also called third object relative to the first object B3).

The exchange of this information useful for the positioning between the object B2 and the object B3 (as well as possibly information useful for the positioning from the other objects), and in particular the cross-referencing of information between the different objects, allows knowing the location of each object relative to each other (to the delta near the accuracy of the technique used to know the distance therebetween).

For example, the object B2 can update its table based on information received from the object B3:

| Identifier remote Object 2 | Distance relative to Object 1 (B2) | Location relative to the magnetic north | Height relative to the ground | Other information (for example: direction of object) |
|---|---|---|---|---|
| B1 | 30 cm | 90° | 60 cm | B3 is positioned between B2 and B4, therefore B1 is to the right of |

-continued

| Identifier remote Object 2 | Distance relative to Object 1 (B2) | Location relative to the magnetic north | Height relative to the ground | Other information (for example: direction of object) |
|---|---|---|---|---|
| B3 ... | 30 cm | 90° | 60 cm | B2 (i.e. on the side opposite to B3 relative to B2) B3 is positioned between B2 and B4 |

Figure 9A:
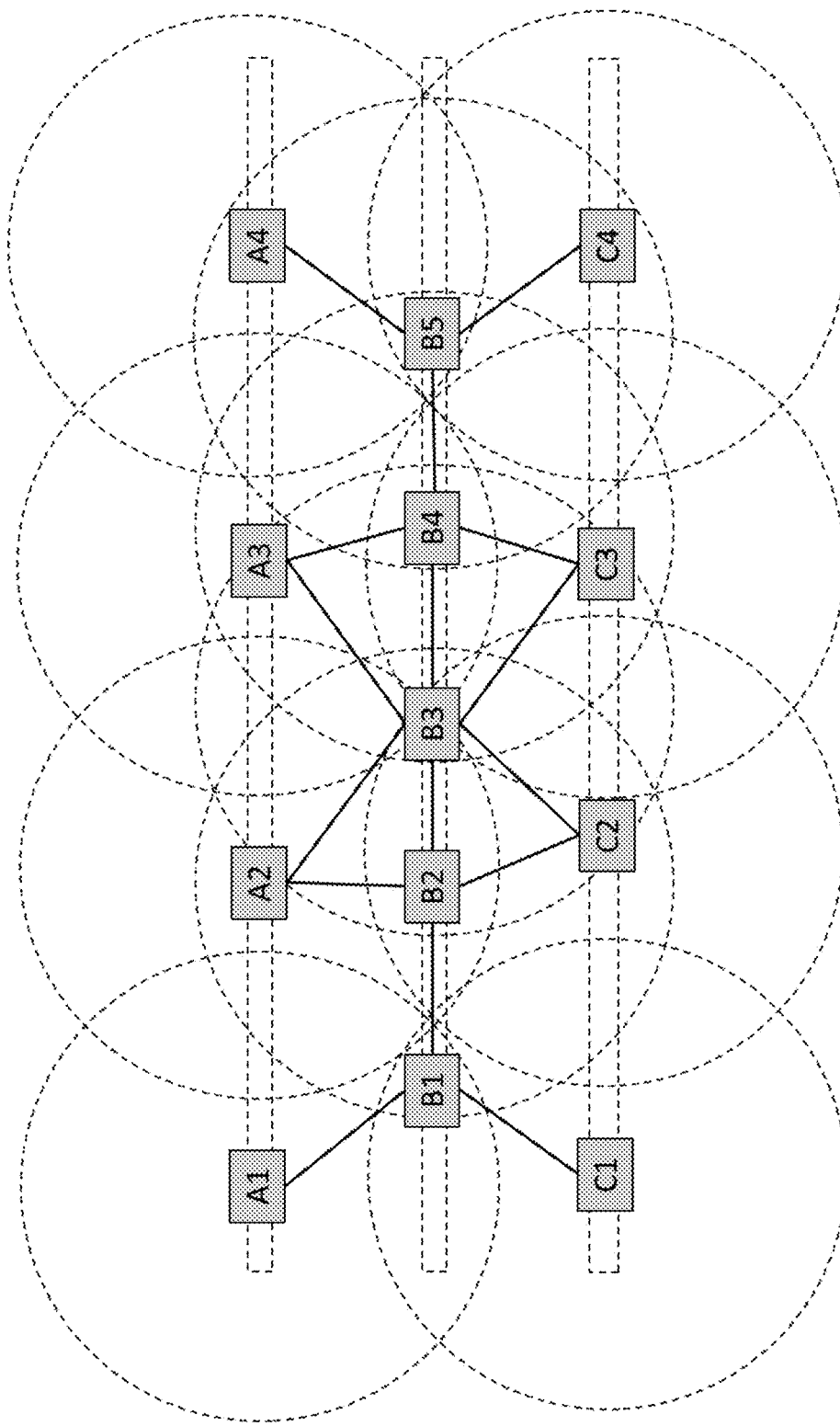
FIG. 9A and FIG. 9B show the construction of a positioning map of the different objects therebetween according to an embodiment.

FIG. 9A thus illustrates the coverage area of each tag of the racking I, in front view, and the communication links between the different objects.

Figure 9B:
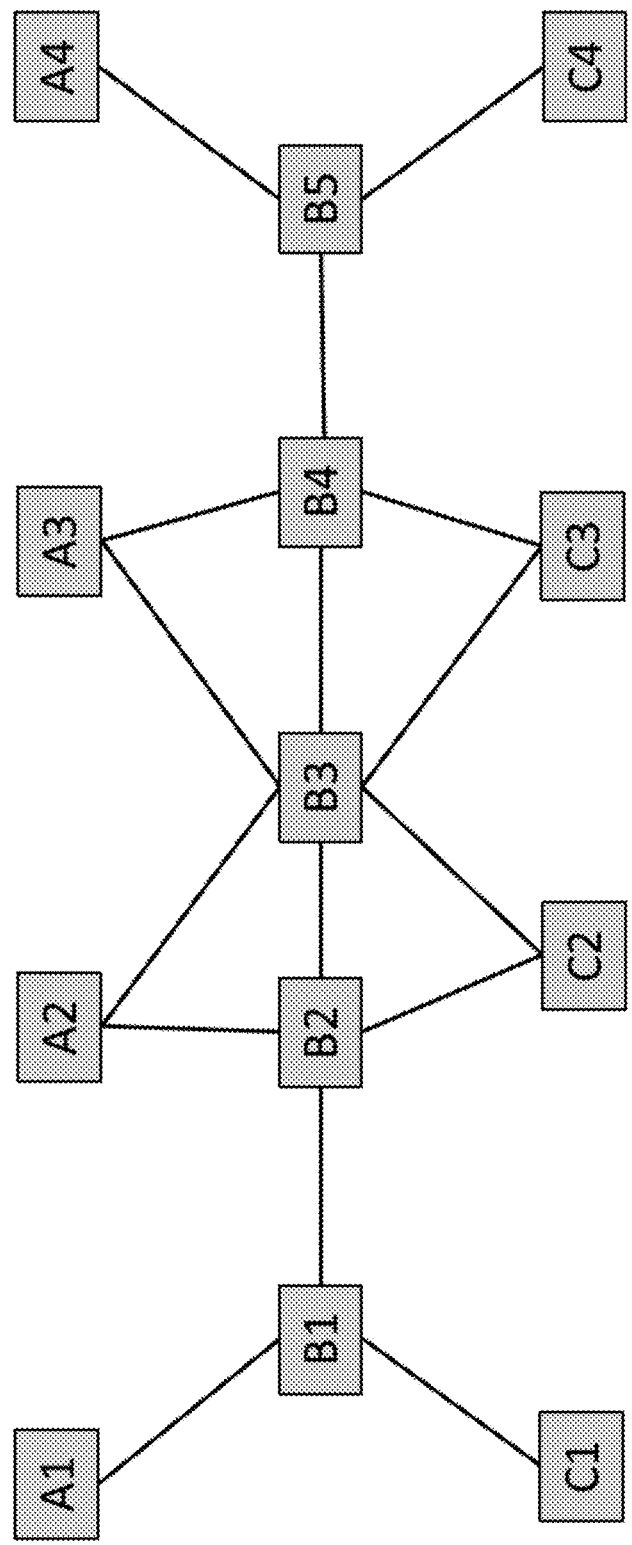
Figure 10:
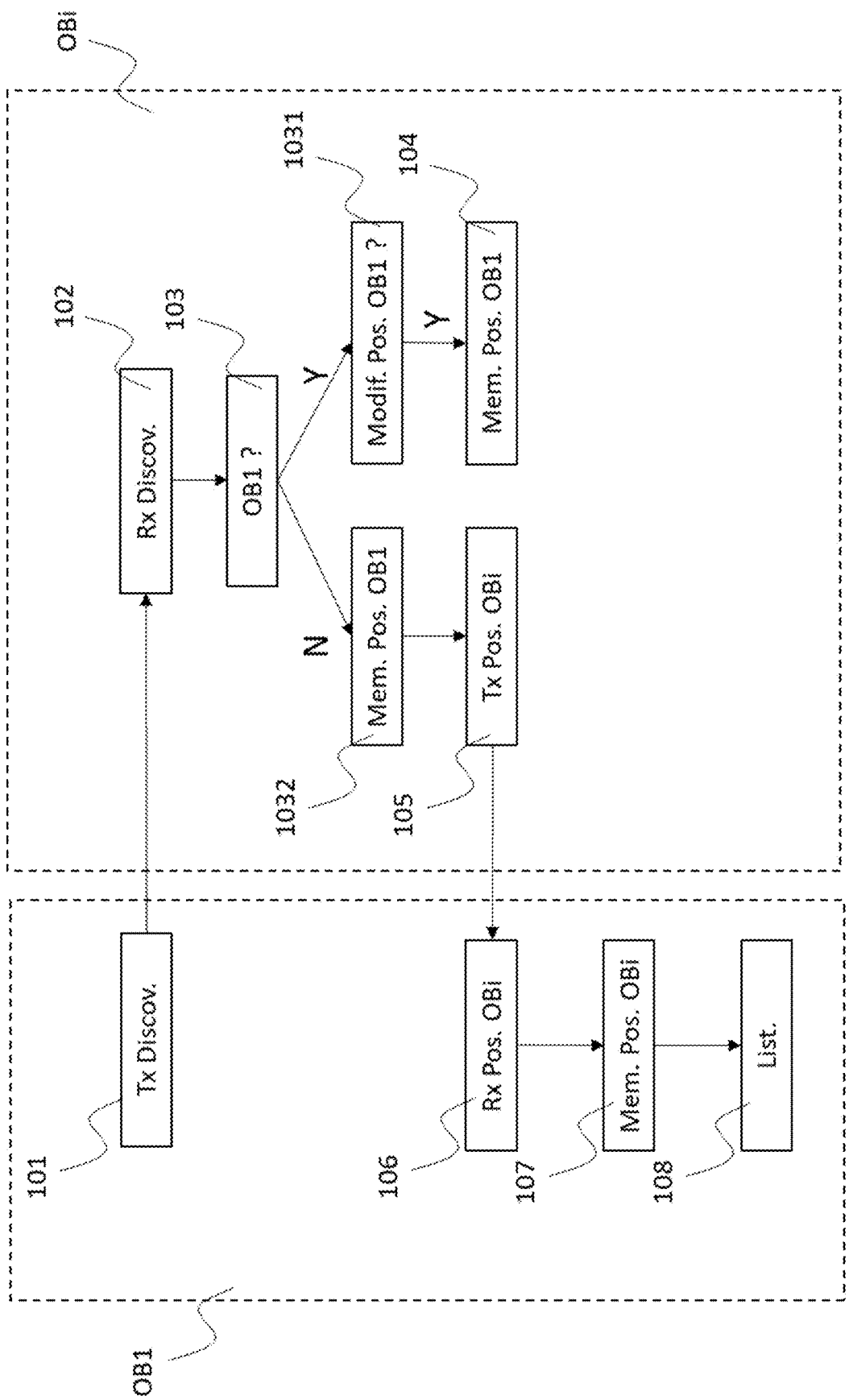
FIG. 10 schematises an algorithm for discovering the neighbours of a first object.

As illustrated in FIG. 9B, it is thus possible to create a set of neighbourhood graphs for the different objects, and to assemble them progressively. For example, one starts constructing the neighbourhood graph of B1, when B1 is considered as a first object. The neighbourhood graph of B2 is then constructed, when B2 is considered as a first object. As indicated above, there remains uncertainty about the position of the objects B1 and B3. The neighbourhood graph of B3 is then constructed, when B3 is considered as a first object. The construction of this neighbourhood graph allows defining the position of B1. The process is carried out so on, until the creation of the complete graph representing the positioning of all the objects of the system of FIG. 1 for example.

The cross-referencing of information from the different objects thus allows removing doubts and/or residual unknowns as to the positioning of the objects relative to each other (some objects having several candidate positions), to arrive at a positioning map on the different shelves (or other) where an object has only one possible position.

Moreover, it is noted that the obtained graph allows having a three-dimensional view of the connections between the objects. By way of illustration, FIG. 9B illustrates a 2D view of the connections between the different tags of the rack I.

This vision of the infrastructure of connectivity between objects of the system can be very useful in the case of data exchange between the objects (for example to perform a configuration or an update at least some of the objects).

According to one embodiment, it is thus possible to perform a configuration or update of the objects from a single entry point (a single object), which can be propagated from one object to the other by P2P on all or part of the infrastructure. For example, an information item communicated to the object B1 can propagate to the objects A1, C1, B2, then from the object B2 to the objects A2, B3, C2, then from the object B3 to the objects A3, B4 and C3, then from the object B4 to the object B5, then from the object B5 to the objects A4 and C4.

In particular, such a map for positioning the objects therebetween can be dynamically updated. In particular, if an object moves (for example if a tag falls), the position of this object is modified, and the positioning map is updated. In particular, in certain embodiments, an alarm can be triggered.

An example of algorithm which can be implemented by at least one first object, and possibly by all the objects, of the system of FIG. 1 for example, periodically or following an event (for example, in the case of detection of a change of position). The algorithm below can in particular be implemented in the step 22 of obtaining the relative position of at least one second object relative to the first object.

In a first step 101, the first object OBJ1 requests the neighbours thereof, i.e. at least one second object, to announce themselves. For example, the first object transmits a discovery multicast query, or any other query according to the communication protocol available in the system.

At least one neighbour OBi receiving 102 the discovery multicast query checks 103 whether it knows the first object OBJ1 (i.e. the first object is a known neighbour).

If yes, the neighbour OBi checks 1031 if the position and/or at least one information useful for the positioning which is received from the first object OBJ1 has changed (for example the height of the first object OB1 relative to the ground, or its orientation relative to the magnetic north). If the position and/or at least one information item of the first object OBJ1 has changed, the neighbour OBi can store 104 the new information of the first object OBJ1. In both cases (modification of the position/information of the first object OB1, or no modification) the neighbour OBi can respond to the first object OB1 that it is still there and that nothing has changed for it.

Otherwise, i.e. if the first object OB1 is unknown (because it is a new neighbour), the neighbour OBi stores 1032 the position and/or at least one information item useful for the positioning which is received from the first object OBJ1 in its list of new neighbours. The neighbour OBi can then send 105, to the first object OBJ1, its position or at least one information item useful for the positioning belonging to the group comprising its location relative to the magnetic north, its spatial orientation (pitch, roll, yaw), its height relative to at least one reference point, its distance with the first object OBJ1 if it is known, other additional information such as for example the list of the already known neighbours thereof, etc.

Upon receipt of the position or at least one information item from the neighbour OBi, the first object OB1 stores 107 the information returned by the neighbour OBi, and more generally by each neighbour i responding to the discovery multicast query, and thus dynamically constructs 108 its list of nearest neighbours and/or the corresponding positioning map.

Moreover, it is noted that if a neighbour OBj no longer responds or has disappeared since the last search for neighbours (i.e. since the last discovery multicast query), the first object OB1 can delete this neighbour OBj from its list of nearest neighbours.

Moreover, if an object is moving, or new in the system, it can send to all objects with which it can communicate (via any type of communication protocol) an information item indicating that it is moving or that it is new in the system. For example, such an information item can be transmitted in a multicast message. This object can also notify the neighbours thereof that they should be updated.

Variants

An embodiment has been described above according to which the objects themselves determine their relative position relative to the other objects. Each object can thus determine its position and locally determine a subset of possible neighbours, or even exchange information with the direct neighbours. Each object can thus construct a three-dimensional sub-graph to position in space all the objects in the vicinity relative thereto.

Alternatively, the objects of the system can transmit their position or at least one information item useful for the positioning to a remote server, for example a gateway, which is responsible for determining the positions of the different objects therebetween.

As described above, regardless of the embodiment, it is possible to construct a map for positioning the different objects of the system by gathering all the information useful for the positioning from the different objects. In other words, by taking the information collected by each object, or directly each sub-graph from each object, it is possible to produce such a map, or graph, which aggregates all the information, and accurately positions, in space, all the objects relative to each other, without the need for beacons or anchors whose geographical coordinates are known in advance. Such a map thus offers a three-dimensional vision of the infrastructure in space, or a 2D vision.

In particular, each object has information from neighbouring objects located in the vicinity of its position, including for example:
  an identifier of the neighbouring object,
  a location of the neighbouring object relative to the magnetic north,
  a spatial orientation of the neighbouring object,
  a distance with the neighbouring object,
  a height of the neighbouring object relative to at least one reference point,
  possibly other information that brings more accuracy.

In particular, according to one embodiment, if an object is moved from one location to another, the object itself is able to recalculate its position (in particular its height relative to the ground, its location relative to the magnetic north) and its relative position relative to other neighbouring objects. A new sub-graph can thus be generated. The neighbouring objects can also update their sub-graph with the new position of the moved object. Thus, only a set of sub-graphs can be regenerated and it is possible to quickly reconstruct the global positioning map.

Examples of Applications

The disclosure finds in particular, but not exclusively, applications in the following fields:
  trade, the objects which can be of storage shelf, price tag, type etc., logistics, the objects which can be parcel tracking tags allowing knowing where the parcels are stored relative to each other, . . . ,
  prevention of theft, the objects which can be works of art from an exhibition, a museum, . . . , vehicles from a garage, a pound, . . . , which are sought to be located relative to each other to be able to trigger an alarm in the case of an anomaly (inadvertent movement of an object for example), etc.,
  fleet management, the objects which can be drones which are sought to be located relative to each other, without a known point on the ground or in space, for example in the case of impossibility of positioning by satellite (failing GPS or constrained environment, for example interior of a building, caves, basement, . . . ).

More generally, the disclosure applies to any object whose position in space is desired to be known, without having beacons or anchors whose positions are known in advance.

For example, considering again the field of trade, and considering that the objects are of the price tag type.

Such price tags can be smart tags, and carry screens allowing, for example, scroll advertisements relating to the products to which they are dedicated. Such tags allow drawing the attention of the customers to certain products, or even to all the products in a store.

However, the multiplication of these price tags is a problem when it comes to manually configuring them one by one.

With the proposed solution, the tags can know their neighbours (left or right on the same shelf, above or below in the same racking, on the same back-to-back racking, on distinct opposite rackings, etc) and communicate at least two to two. This allows each tag to be located relative to its neighbours, and to be able to communicate more effectively with the tags in direct proximity if necessary.

For example, returning to FIG. 9B, it is known that the tags B1-B2, B2-B3, B3-B4, B4-B5 can communicate two to two. Thus, if a user passes in front of the tags B1, B2, B3, B4, B5 in this order, it is possible to identify the path of the user in the aisle and to scroll a message on the tag B1, then on the tag B2 following the transmission of the message from the tag B1 to the tag B2, and so on. It is thus possible that the message carried by the tag follows the path of the user, for example to inform him of a new promotional offer.

Devices

Figure 11:
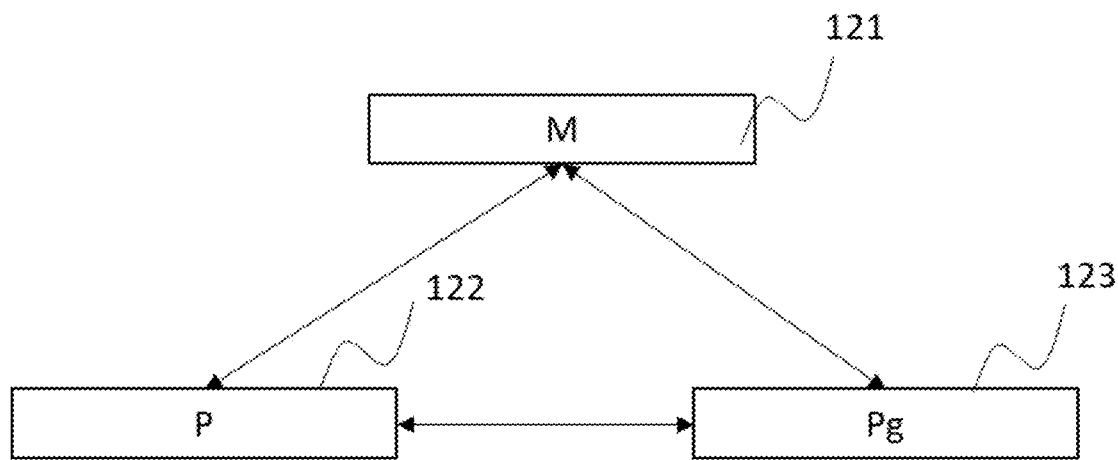
FIG. 11 and FIG. 12 illustrate respectively the simplified structure of an object and a server according to different embodiments.
Figure 12:
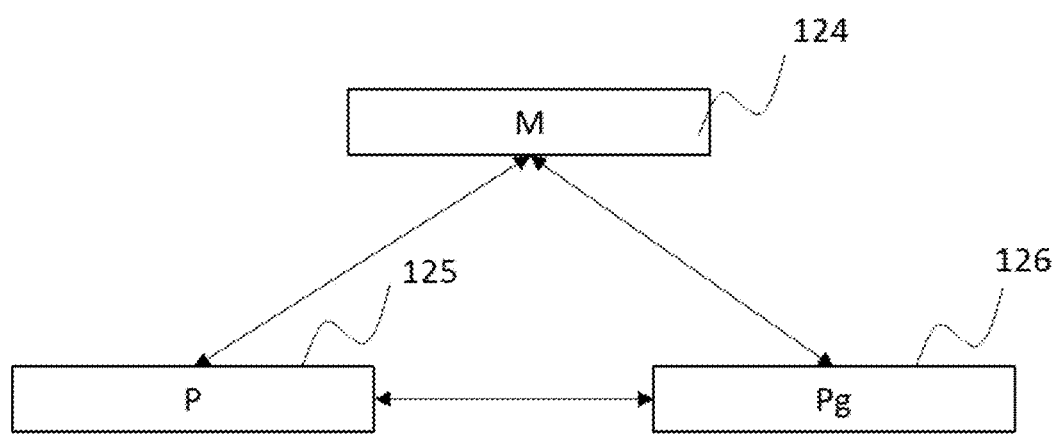

With reference to FIGS. 11 and 12, the simplified structures of an object and of a server according to at least one embodiment are finally shown.

As illustrated in FIG. 11, an object according to one embodiment comprises a memory 121, a processing unit 122, equipped for example with a programmable calculation machine or a dedicated calculation machine, for example a processor P, and driven by the computer program 123, implementing steps of the object positioning method according to at least one embodiment.

Upon initialisation, the code instructions of the computer program 123 are for example loaded into a RAM memory before being executed by the processor of the processing unit 122.

The processor of the processing unit 122 of the object implements steps of the previously described object positioning method, according to the instructions of the computer program 123, to:
  determine the position of this first object (in particular its location relative to the magnetic north and its height relative to at least one reference point),
  obtain a relative position of at least one second object relative to the first object.

As illustrated in FIG. 12, a server according to one embodiment comprises a memory 124, a processing unit 125, equipped for example with a programmable calculation machine or a dedicated calculation machine, for example a processor P, and driven by the computer program 126, implementing steps of the object positioning method according to at least one embodiment.

Upon initialisation, the code instructions of the computer program 126 are for example loaded into a RAM memory before being executed by the processor of the processing unit 125.

The processor of the processing unit 125 of the server implements steps of the previously described object positioning method, according to the instructions of the computer program 125, to:
  obtain a position of a first object,
  obtain a position of at least one second object,
  determining the relative position of said at least one second object relative to said first object.

The invention claimed is:

1. A method for positioning objects, implemented in a first object having a hardware processor, the first object in communication with at least one second object, the first and second objects not being points with known geographical coordinates, the method comprising:
   determining a position of said first object via the hardware processor, determining the position comprising:
      determining a location of said first object relative to the magnetic north using at least a first sensor,
      determining a height of said first object relative to at least one reference point using at least a second sensor,
   obtaining the relative position of said at least one second object relative to said first object, without the use of fixed anchor points,
   wherein obtaining the relative position of said at least one second object relative to said first object comprises obtaining a distance between said first object and said at least one second object.

2. The method according to claim 1, wherein obtaining the relative position of said at least one second object relative to said first object comprises detecting a radio signal transmitted by said at least one second object.

3. The method according to claim 1, further comprising transmitting, from said first object to said at least one second object or to a remote server, of at least one first information item useful for positioning said objects.

4. The method according to claim 1, further comprising receiving, from said at least one second object or from a remote server, at least one second information item useful for positioning said objects.

5. The method according to claim 1, wherein obtaining the relative position of one of said at least one second object relative to said first object implements an estimation of the position of said second object relative to said first object, delivering at least two candidate positions, a reception of at least one third information item useful for positioning said objects from at least one third object, and relating to a communication of said third object with said first object and/or said second object, and a selection of one of said candidate positions by taking into account said at least one third information item, useful for positioning said objects, received from said third object.

6. The method according to claim 3, wherein said at least one first information item useful for positioning said objects from said first object belongs to the group comprising:
   an identifier of said first object,
   a location of said first object relative to the magnetic north,
   a spatial orientation relative to a reference mark of said first object,
   a distance between at least two of said objects,
   a height of said first object relative to said at least one reference point.

7. The method according to claim 4, wherein said at least one second information item useful for positioning said objects from said second object belongs to the group comprising:
   an identifier of said second object,
   a location of said second object relative to the magnetic north,
   a spatial orientation relative to a reference mark of said second object,
   a distance between at least two of said objects,
   a height of said second object relative to said at least one reference point.

8. The method according to claim 5, wherein said at least one third information item useful for positioning said objects from said third object belongs to the group comprising:
   an identifier of said third object,
   a location of said third object relative to the magnetic north,
   a spatial orientation relative to a reference mark of said third object,
   a distance between at least two of said objects,
   a height of said third object relative to said at least one reference point.

9. The method according to claim 1, further comprising storing at least one element belonging to the group comprising:
   the position of said first object,
   the relative position of said at least one second object relative to said first object,
   at least one information item useful for positioning said objects.

10. The method according to claim 1, wherein at least one of said steps is implemented periodically or in an event-driven manner.

11. The method according to claim 1, further comprising constructing a map for positioning said first and at least one second object.

12. The method according to claim 1, further comprising obtaining, by the first object, configuration or update information of said first object, and transmitting, step by step, said configuration or update information to a set of objects.

13. The method according to claim 1, further comprising triggering an alarm in the case of detection of a change in position of said first object or at least one second object.

14. The method according to claim 1, wherein said obtaining the relative position of said at least one second object relative to said first object takes account of at least one physical constraint related to the place where said objects are positioned.

15. A method for positioning objects, implemented in a remote server having a hardware processor, the remote server in communication with a first object and at least one second object, the first and second objects not being points with known geographical coordinates, the method performed by the hardware processor and comprising:
   obtaining a position of said first object,
   obtaining a position of said at least one second object,
   determining a relative position of said at least one second object relative to said first object, without the use of fixed anchor points, using at least a sensor, the position of said respective first and second objects comprising:
   a location of said respective first and second objects relative to the magnetic north,
   a height of said respective first and second objects relative to at least one reference point,
   wherein determining the relative position of said at least one second object relative to said first object comprises obtaining a distance between said first object and said at least one second object.

16. A device comprising:
   a hardware processor configured to obtain a position of a first object comprising:
      a location of said first object relative to the magnetic north,
      a height of said first object relative to at least one reference point, and
   to obtain a relative position of at least one second object, in communication with the first object, relative to said first object, without the use of fixed anchor points, wherein the first and second objects not being points with known geographical coordinates and wherein obtaining the relative position of said at least one second object relative to said first object comprises obtaining a distance between said first object and said at least one second object.

17. The device according to claim 16, further comprising the hardware processor configured to obtain configuration or update information of said first object, and to transmit, step by step, said configuration or update information to a set of objects.

18. The device according to claim 16, wherein said device is the first object and said hardware processor configured to obtain a position of a first object comprises:
   at least a first sensor configured to determine said location of said first object relative to the magnetic north,
   at least a second sensor configured to determine said height of said first object relative to at least one reference point.

19. The device according to claim 16, wherein said device is a server, and the device further comprises:
   means for obtaining a position of said at least one second object comprising:
      the location of said second object relative to the magnetic north,
      the height of said second object relative to at least one reference point.

20. A method for positioning objects, implemented in a first object having a hardware processor, the first object in communication with at least one second object, the first and second objects not being points with known geographical coordinates, the method comprising:
   determining a position of said first object via the hardware processor, determining the position comprising:
      determining a location of said first object relative to the magnetic north using at least a first sensor,
      determining a height of said first object relative to at least one reference point using at least a second sensor,
   obtaining the relative position of said at least one second object relative to said first object without the use of fixed anchor points,
   further comprising obtaining, by the first object, configuration or update information of said first object, and transmitting, step by step, said configuration or update information to a set of objects.

* * * * *